United States Patent [19]

Siegal

[11] 4,450,375

[45] May 22, 1984

[54] PIEZOELECTRIC FLUID CONTROL DEVICE

[75] Inventor: Burton L. Siegal, Skokie, Ill.

[73] Assignee: KIWI Coders Corporation, Wheeling, Ill.

[21] Appl. No.: 440,966

[22] Filed: Nov. 12, 1982

[51] Int. Cl.³ .............................................. H01L 41/08
[52] U.S. Cl. ..................................... 310/331; 310/330; 310/332; 137/831
[58] Field of Search ....................... 310/328, 330–332; 251/129, 291, 335 R, 335 A; 137/831, 837, DIG. 2; 116/DIG. 7

[56] References Cited

U.S. PATENT DOCUMENTS

| 4,011,474 | 3/1977 | O'Neill | 310/328 |
| 4,032,929 | 6/1977 | Fischbeck et al. | 310/328 X |
| 4,072,959 | 2/1978 | Elmqvist | 310/330 X |
| 4,318,023 | 3/1982 | O'Neill et al. | 310/328 |

*Primary Examiner*—Mark O. Budd
*Attorney, Agent, or Firm*—Silverman, Cass & Singer, Ltd.

[57] ABSTRACT

A piezoceramic bender cooperates with an impacting member, membrane and valve seat to provide a novel piezoelectric transducer arrangement for achieving desired rapid and accurate control of fluids under pressure in a variety of different applications, such as, computer printing, fluidics, etc. The bender is advantageously isolated from the fluid in operation.

14 Claims, 5 Drawing Figures

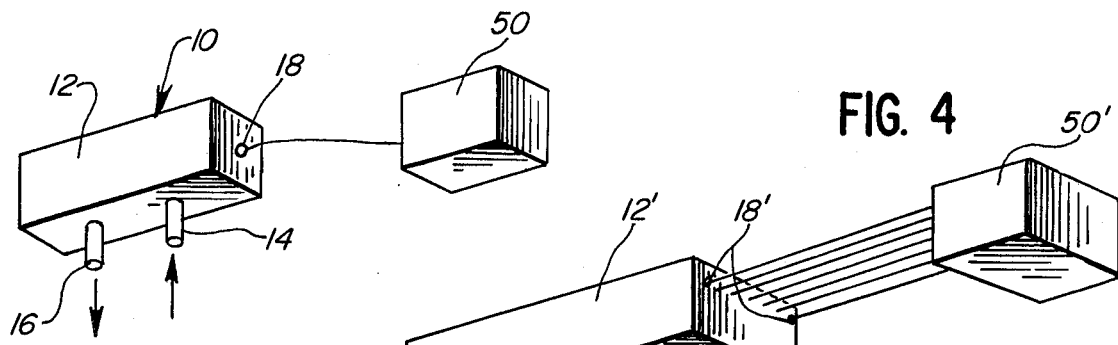
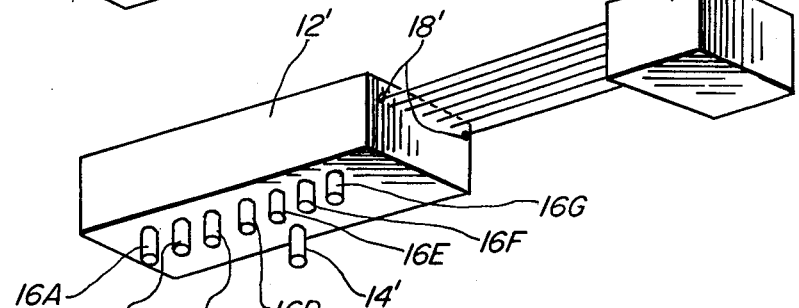
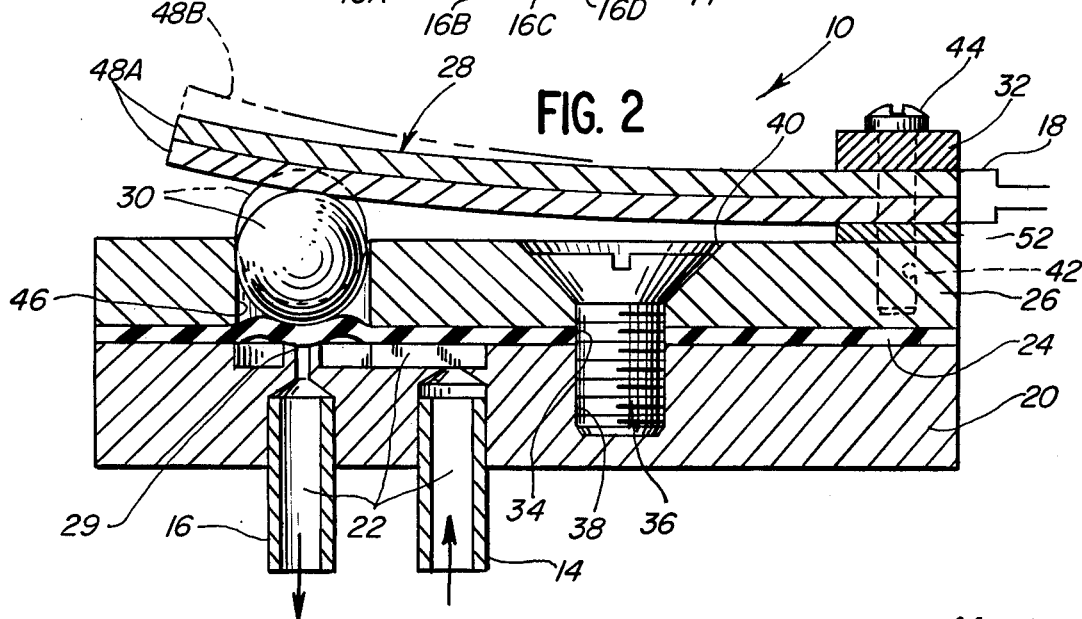
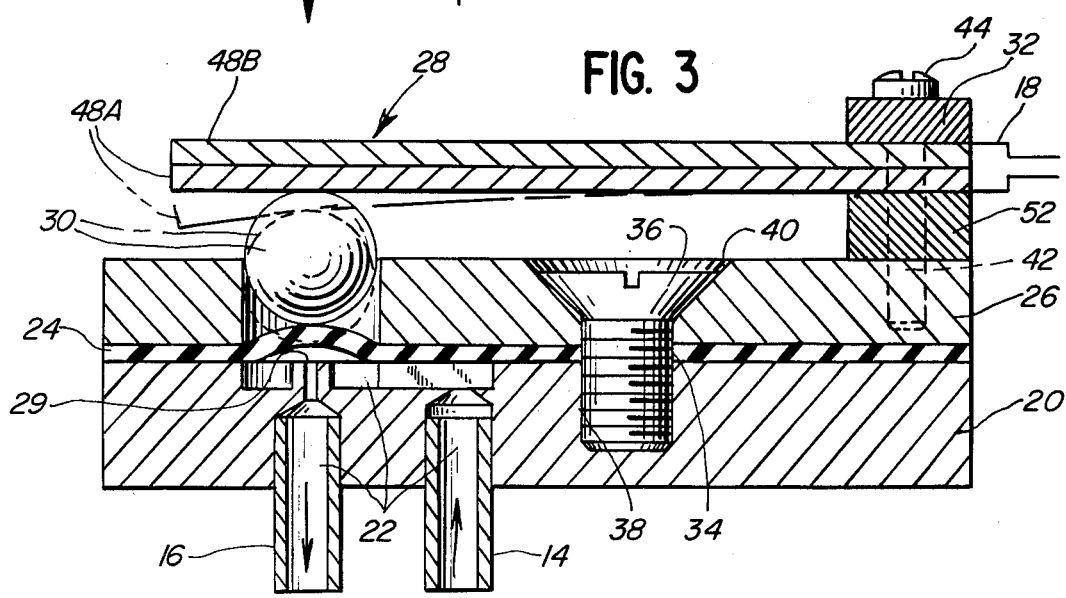

PIEZOELECTRIC FLUID CONTROL DEVICE

BACKGROUND OF THE INVENTION

The invention herein relates generally to a fluid control device, and more particularly, to a device for rapid and accurate control of a fluid that is under pressure. The fluid to be controlled can be various gases or liquids.

It is known to use a piezoelectric element as a valve driver. Cummins, U.S. Pat. No. 4,340,083 discloses a valve including a piezoelectric bar arranged in the valve reservoir and mounted as a cantilevered beam with the free end of the piezoelectric bar being mounted for movement toward and away from a valve seat surrounding a control opening in response to the application of an electrical signal.

It is known to use a stack of piezoelectric discs as a driver for an undamped spring-mass system. Smiley, U.S. Pat. No. 3,614,486 discloses the use of a stack of thin piezoelectric discs as a driver for applications which require high speed, accuracy and virtually no vibration.

The known devices position the piezoelectric member in contact with the fluid. Thus, the known devices require protective coatings on the piezoelectric beam and electrical connections to protect the same from chemical attack by the fluid. Additionally, mechanical problems result from the fluid contact with the piezoelectric member.

The invention provides a fluid control device or valve including a piezoelectric transducer that functions to control the flow of the fluid. The invention herein differs from prior valves by providing the piezoelectric transducer outside the valve reservoir whereby the piezoelectric transducer does not contact the fluid and by providing a structure that is simple, economical to manufacture and highly effective for the intended purpose of rapidly and accurately controlling fluid flow.

SUMMARY OF THE INVENTION

A fluid control device is provided for use in selectively dispensing desired quantities a fluid that is contained under pressure. The piezoelectric device comprises a valve body having a fluid chamber and inlet and outlet means fluid communicating with said chamber with said inlet means adapted to be connected to a source of said fluid under pressure; and fluid control valve means for controlling such fluid dispensation through said outlet means comprising said body having at least one valve seat communicating with said outlet means; a deformable member mounted on said valve body in cooperation with said valve seat and impacting means engageable with said deformable member for selectively distorting said member proximate said valve seat so as to establish or disrupt such communication with said outlet means as desired; and piezoelectric means mounted on said valve body and adapted to be electrically connected to a D.C. source; said bender means having a deflectable portion engaging said impacting member which can be selectively moved upon energizing or deenergizing said bender means for selectively distorting the deformable member.

BRIEF DESCRIPTION OF THE DRAWINGS

FIG. 1 is a partly schematic, perspective view of a fluid control device constructed in accordance with the invention;

FIG. 2 is an enlarged sectional detail of the device shown in FIG. 1, the housing normally enclosing the device being removed;

FIG. 3 in an enlarged sectional detail similar to FIG. 2 illustrating an alternate embodiment of the device of FIG. 1, the housing normally enclosing the device being removed;

FIG. 4 is a partly schematic, perspective view of a modified from of the invention providing a plurality of fluid control devices.

DESCRIPTION OF THE PREFERRED EMBODIMENTS

Figure 5:
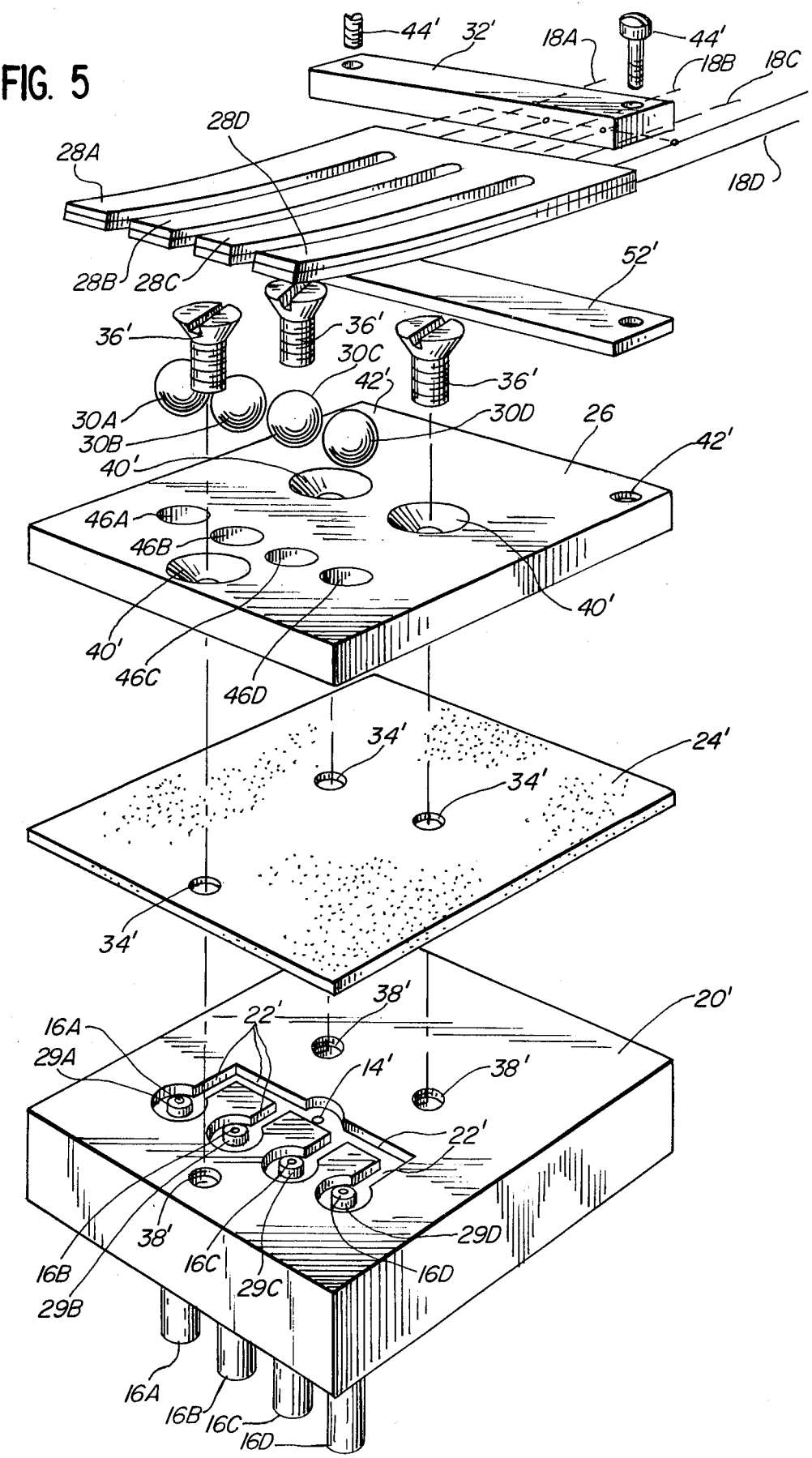
FIG. 5 is an exploded perspective view of a modified embodiment of the invention similar to the device shown in FIG. 4.

Referring to FIGS. 1 and 2, there is illustrated a preferred embodiment of the invention that is identified generally by the reference character 10. The device 10 provides for high speed operations and accuracy without residual motion. The piezoelectric drive mechanism, that provides the high speed operation and accuracy, actuates the device 10 without being in contact with the fluid to be controlled, thereby avoiding mechanical and chemical problems with the piezoelectric member. The fluid control device 10 includes a generally rectangular housing 12, a fluid inlet port 14, a fluid outlet port 16 and an electric power connection 18.

Enclosed within the housing 12 are a generally rectangular valve body 20 having a chamber or passageway 22 communicating with the input port 14 and the outlet port 16, a membrane 24, a mounting block 26, a piezoelectric driver mechanism 28, a impacting member 30, and clamping member 32. The fluid is contained entirely within the chamber 22 defined by the valve body 20 and the membrane 24, whereby the impacting member 30 and the piezoelectric driver mechanism 28 are separated from the fluid. The chamber 22 within the valve body 20 is arranged to provide a valve seat 29. The valve seat 29 is substantially coplanar with the generally planar surface 21 of the valve body 20.

The membrane 24 is a strong, pliable member and can be formed of a polymer material, such as the material sold under the registered trademark of Teflon by Dupont Company, or any of various elastomers or rubber. The material for the membrane 24 must be selected on the basis of abrasion resistance, chemical compatability with the fluid, and elasticity and resilience characteristics. The membrane 24 can be provided corresponding in dimensions to the rectangular valve body 20, except with a generally thin wall thickness, for example 0.015 inches. The membrane 24 is secured to the upper, generally planar surface 21 of the valve body 20 and is arranged movably and resiliently in a vertical plane with the valve seat 29. The membrane 24 functions as a gasket by sealing around the openings for mounting screws. The membrane 24 provides a fluid-tight seal at the valve seat 29 with the impacting member 30 exerting a predetermined force on the membrane 24.

Mounting screws 36 are employed to couple the mounting block 26, membrane 24 and the valve body 20 and provide the clamping around the chamber. Openings 34 are provided in the membrane 24 to allow passage of a mounting screws 36. Corresponding openings 38 are provided in the valve body 20 to receive the mounting screws 36. The use of the mounting screws 36 conveniently provide for changing the membrane 24 depending on the chemical nature of the fluid to be controlled.

The mounting block 26 is provided with openings 40 to receive the mounting screws 36. Second openings 42 are provided to receive mounting screws 44. The mounting screws 44 are employed to couple the clamping member 32, the piezoelectric drive mechanism 28, the spacer 52 and the mounting block 26. A third opening 46 is provided in the mounting block 26 to retain the impacting member 30 in position concentric with the valve seat 29 in the valve body 20 and in a vertical plane therewith. The mounting block 26 can be substantially equal in overall dimensions to the rectangular valve body 20.

The piezoelectric driver mechanism 28 is provided as a rectangular bar having overall dimensions less than the overall dimensions of the valve body 20. The piezoelectric driver mechanism 28 is illustrated in FIGS. 2 and 3 as two like piezoelectric members 48A, 48B secured together. The number of the piezoelectric members 48A, 48B secured together in a stack determines the total force that can be generated by the driver mechanism 28. The total force that can be generated by the driver mechanism 28 increases in proportion to the number of piezoelectric members 48A, 48B provided in the stack. The number of piezoelectric members 48A, 48B is selected to satisfy the operating requirement of the particular application. The piezoelectric members 48A, 48B are secured together and are connected electrically in parallel. For example, the stack of two like piezoelectric members 48A, 48B can provide a driver mechanism having a thickness of about 1/32 inch. Although illustrated as connected electrically in parallel, a series connection of the piezoelectric members 48A and 48B is feasible within the skill in the art.

The electrical power connection 18 is provided to the upper and lower surfaces of the piezoelectric driver mechanism 28 and is connected to a variable D.C. power supply 50. The piezoelectric driver mechanism 28 is mounted at its fixed end through a spacer 52 to the mounting block 26. The free-end of the piezoelectric driver mechanism 28 is arranged to move toward and away from the impacting member 30 in predetermined relation to the polarity and level of the applied voltage. The amplitude of the movement or deflection of the free-end of the piezoelectric driver mechanism 28 increases corresponding to increases in the level of the applied voltage, so that valve 10 can be used as a throttle valve by varying the level of the applied voltage.

FIG. 2 illustrates a normally closed valve 10; the piezoelectric driver mechanism 28 is mechanically deflected and holding the impacting member 30 against the membrane 24, and membrane 24 against the valve seat 29 with the power source 50 deactivated. The driver mechanism 28 is arranged to provide a fluid-tight sealed engagement between the membrane 24 and the valve seat 29 with the electrical power source 50 deactivated. The free end of the piezoelectric drive mechanism 28 is caused to further deflect and move away from the impacting member 30 by activating the electrical power source 50, thereby providing a path for fluid flow through chamber 22.

The amount of fluid flow can be controlled by varying the level of the voltage applied to the piezoelectric driver mechanism 28 and also, the time duration of the applied voltage.

FIG. 3 illustrates a normally open valve 10 wherein the piezoelectric driver mechanism 28 is arranged to provide a path for fluid flow through chamber 22 when the power source 50 is deactivated. The spacer 52 is provided with additional height than is used for the normally closed valve illustrated in FIG. 2. Thus, the free-end of the piezoelectric driver mechanism 28 is disposed at a higher position whereby the fluid flows from inlet port 14 through the chamber 22 and past valve seat 29 to the outlet port 16 with the power source 50 deactivated. The free end of the piezoelectric driver mechanism 28 is caused to deflect and move toward the impacting member 30 by activating the electrical power source 50, thereby throttling the fluid flow through chamber 22. At a predetermined level of applied voltage, the free end of the piezoelectric driver mechanism 28 moves the impacting member 30 against the membrane 24, such that the membrane 24 exerts a fluid-tight sealing force on the valve seat 29 and closes chamber 22.

The vertical dimension of the spacer 52 can be used to provide for a normally closed or normally open valve with the polarity of the electrical connection 18 determining the direction of movement of the deflectable portion of the piezoelectric drive mechanism 28.

Referring to FIGS. 4 and 5, modified forms of the invention are illustrated, each providing a plurality of fluid control devices with a housing 12.

In FIG. 4, one inlet port 14' and seven outlet ports 16A, 16B, 16C, 16D, 16E, 16F, 16G are provided. A separate and individual electrical connection 18' is provided to each of the seven fluid control devices thereby providing for separate and independent operation of each.

FIG. 5 is an exploded perspective view of a multiple valve body including four fluid control devices. The valve body 20' has a chamber 22' connecting the input port 14' to the four outlet ports 16A, 16B, 16C, 16D and is arranged to provide four valve seats 29A, 29B, 29C, 29D. Openings 38' are provided in the valve body 20' to receive mounting screws 36'. A membrane 24' is secured to the upper, generally planar surface of the valve body 20' and is arranged movable and resiliently in the vertical planes with the valve seats 29A, 29B, 29C, 29D. Corresponding to the openings 38' in the valve body 20', openings 34' are provided in the membrane 24' to allow passage of the mounting screws.

A mounting block 26' is provided with openings 40' corresponding to openings 34' in the membrane 24' to receive the mounting screws 36' that couple the mounting block 26', the membrane 24' and valve body 20'. A pair of opening 42' are provided in the mounting block to receive mounting screws 44' that couple the mounting block 26' to clamping member 32' with the piezoelectric driver mechanism 28' and the spacer 52' secured therebetween.

Openings 46A, 46B, 46C, 46D are provided in the mounting block 26' to retain impacting members 30A, 30B, 30C, 30D and are disposed in the vertical planes with the valve seats 29A, 29B, 29C, 29D. The mounting block 26' can be substantially equal in overall dimensions to the valve body 20'.

The piezoelectric driver mechanism 28' includes four electrically separate drivers 28A, 28B, 28C, 28D with a separate electrical power connection 18A, 18B, 18C, 18D provided to each for individual control. The piezoelectric drivers 28A, 28B, 28C, 28D are illustrated as a stack of four like piezoelectric members 48A, 48B, 48C, 48D. A spacers 52' is employed to determine the separation between the free-ends of the piezoelectric driver mechanism 28A, 28B, 28C, 28D and the impacting members 30A, 30B, 30C, 30D to provide either all normally open or all normally closed valves as hereinbefore described for a single valve 10 as illustrated in FIGS. 1, 2 and 3.

The multiple fluid control devices illustrated in FIGS. 4 and 5 provide for independent, high speed operation and accuracy without residual motion for each of the separate, closely-spaced valves.

Alternatively, a multiple valve body (not shown) can be provided with a plurality of inlet ports corresponding to a plurality of outlet ports. The provision of multiple inlet ports could be useful in fluid control logic applications.

Fluid control devices embodying the invention can be employed in a variety of different applications. Among such applications could be selective dispensing of inks, dyes or the like in the computer printing field, controlled dispensing of medicinals from pumps, implanted in a human for instance, controlling fluid flow in fluidic systems, among others.

Although the impacting member 30 has been illustrated as a sphere or ball to provide a surface which can cooperate with the valve seat 29 and membrane 24, it will be understood that member 30 may have a different configuration within the purview of the invention. For example, member 30 may be a cylinder or a flattened ball which presents such a cooperating surface with the valve seat, including the member 24. Obviously, the impact member 30 may have other useful configurations. For descriptive purposes only, the term "polyhedral-like member", as used herein, shall be construed to include any configuration of impact member suitable for the purposes described.

Many other variations are capable of being made without departing from the spirit or scope of the invention as defined in the appended claims.

What it is desired to be secured by Letters Patent of the United States is:

1. A piezoelectric device for selectively dispensing desired quantities of a fluid under pressure comprising:
   A. a valve body having a fluid chamber and inlet and outlet means communicating with said chamber with said inlet means adapted to be connected to a source of said fluid under pressure; and
   B. fluid control valve means for controlling such fluid dispensation through said outlet means comprising:
      I. said body having at least one valve seat communicating with said outlet means;
      II. a deformable member mounted on the valve body in cooperation with said valve seat effective to control communication with said outlet means about said valve seat and impacting means directly engageable with the deformable member for selectively distorting said member proximate said valve seat to change the condition of said deformable member about said valve seat so as to establish or disrupt such communication with said outlet means as desired; and
   C. piezoelectric bender means mounted on the valve body isolated from said fluid chamber and adapted to be electrically connected to a D.C. source; said bender means including a deflectable portion engaging said impacting means to move same selectively upon energizing or deenergizing of said piezoelectric bender means for selectively distorting the deformable member without either said impacting means or said bender means contacting said fluid.

2. A device as described in claim 1 in which said deformable member comprises a membrane and said impacting means comprises a member having a surface complementary with said valve seat.

3. A device as described in claim 1 in which said outlet means comprise a plurality of separate outlets each communicating with said chamber; and said device includes a like plurality of valve seats, impacting means and bender means cooperating with said deformable member for selectively dispensing fluid from said separate outlets upon energizing or deenergizing said bender means.

4. A device as described in claim 3 in which said deformable member comprises a membrane and said impacting means comprise a plurality of members each having a surface complementary with a respective valve seat.

5. A device as described in claim 1 in which said impacting means comprises a polyhedral-like member.

6. A device as described in claim 3 in which said impacting means comprise polyhedral-like members.

7. A device as described in claim 1 in which said impacting means comprise a ball member.

8. A device as described in claim 3 in which said impacting means comprise plural balls.

9. A device as described in claim 1 in which said bender means comprises a piezoceramic wafer anchored at one end thereof on said valve body and said deflectable portion is adjacent the opposite end of the wafer.

10. A device as described in claim 3 in which said bender means comprise a plurality of piezoceramic wafers anchored at one end thereof on said valve body and said deflectable portions are adjacent the opposite ends of the wafers.

11. The device as described in claim 1 in which said valve body includes a mounting plate having said impacting means supported thereby in registry with said valve seat.

12. The device as described in claim 3 in which said valve body includes a mounting plate having said impacting means supported thereby in registry with said valve seats.

13. The device as described in claim 1 in which said deformable member is a diaphram formed of one of an elastomer and rubber material.

14. The device as described in claim 3 in which said deformable member is a diaphram formed of one of an elastomer and rubber material.

* * * * *